(12) United States Patent
Guenter

(10) Patent No.: US 10,257,415 B2
(45) Date of Patent: Apr. 9, 2019

(54) FOVEATED CAMERA FOR VIDEO AUGMENTED REALITY AND HEAD MOUNTED DISPLAY

(71) Applicant: Microsoft Technology Licensing, LLC, Redmond, WA (US)

(72) Inventor: Brian K. Guenter, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/421,185

(22) Filed: Jan. 31, 2017

(65) Prior Publication Data
US 2018/0220068 A1 Aug. 2, 2018

(51) Int. Cl.
*H04N 5/232* (2006.01)
*H04N 5/347* (2011.01)
*G06F 1/16* (2006.01)
*H04N 5/272* (2006.01)

(52) U.S. Cl.
CPC ......... *H04N 5/23232* (2013.01); *G06F 1/163* (2013.01); *G06F 1/1637* (2013.01); *H04N 5/23219* (2013.01); *H04N 5/23245* (2013.01); *H04N 5/23293* (2013.01); *H04N 5/272* (2013.01); *H04N 5/347* (2013.01)

(58) Field of Classification Search
CPC ........... H04N 5/23232; H04N 5/23293; H04N 5/23219; H04N 5/23245; G02B 27/017–27/0176
See application file for complete search history.

(56) References Cited

U.S. PATENT DOCUMENTS

| | | |
|---|---|---|
| 5,604,856 A | 2/1997 | Guenter |
| 6,193,660 B1 | 2/2001 | Jackson et al. |
| 6,252,989 B1 | 6/2001 | Geisler et al. |
| 6,340,994 B1 | 1/2002 | Margulis et al. |
| 6,462,768 B1 | 10/2002 | Oakley |
| 6,549,215 B2 | 4/2003 | Jouppi |
| 7,148,860 B2 | 12/2006 | Kooi et al. |
| 7,499,594 B2 | 3/2009 | Kortum et al. |
| 7,542,090 B1 | 6/2009 | Merchant |
| 7,872,635 B2 | 1/2011 | Mitchell |
| 8,223,024 B1 | 7/2012 | Petrou |
| 8,379,915 B2 | 2/2013 | Sharon et al. |

(Continued)

OTHER PUBLICATIONS

Jin, et al., "Analysis and processing of pixel binning for color image sensor", In EURASIP Journal on Advances in Signal Processing, vol. 1, Jun. 21, 2012, 22 pages.

(Continued)

*Primary Examiner* — Abdelaaziz Tissire
(74) *Attorney, Agent, or Firm* — Merchant & Gould

(57) ABSTRACT

Using a foveated camera for video augmented reality via a head mounted display is provided. A camera may be placed in a binning mode; a full frame binned image may be captured using the camera and the binning mode of the camera may be turned off. A region of interest may be selected within the full frame; the region of interest may be captured at a higher resolution than the resolution of the camera when in binning mode; the region of interest may be composited with the full frame binned image; and the composited image may be displayed.

20 Claims, 8 Drawing Sheets

(56) References Cited

U.S. PATENT DOCUMENTS

| | | | |
|---|---|---|---|
| 8,401,081 B2 | 3/2013 | Doser | |
| 8,872,910 B1* | 10/2014 | Vaziri | G02C 11/10 348/78 |
| 8,885,882 B1 | 11/2014 | Yin et al. | |
| 8,937,771 B2 | 1/2015 | Robbins | |
| 9,030,583 B2 | 5/2015 | Gove et al. | |
| 9,094,677 B1 | 7/2015 | Mendis et al. | |
| 9,366,862 B2 | 6/2016 | Haddick et al. | |
| 9,377,852 B1 | 6/2016 | Shapiro et al. | |
| 2002/0063726 A1* | 5/2002 | Jouppi | G05D 1/0246 345/660 |
| 2003/0198393 A1 | 10/2003 | Berstis | |
| 2004/0102713 A1 | 5/2004 | Dunn | |
| 2004/0130649 A1* | 7/2004 | Lee | H04N 5/23212 348/345 |
| 2004/0247167 A1 | 12/2004 | Bueno et al. | |
| 2005/0007453 A1* | 1/2005 | Ahiska | H04N 7/183 348/143 |
| 2005/0017923 A1 | 1/2005 | Kooi et al. | |
| 2005/0018911 A1 | 1/2005 | Deever | |
| 2005/0096543 A1 | 5/2005 | Jackson et al. | |
| 2006/0221067 A1 | 10/2006 | Kim et al. | |
| 2007/0177239 A1 | 8/2007 | Tanijiri et al. | |
| 2008/0002262 A1 | 1/2008 | Chirieleison | |
| 2008/0247620 A1 | 10/2008 | Lewis et al. | |
| 2009/0040308 A1* | 2/2009 | Temovskiy | G02B 27/0068 348/158 |
| 2009/0116688 A1 | 5/2009 | Monacos et al. | |
| 2009/0147126 A1* | 6/2009 | Miyoshi | A61B 3/113 348/360 |
| 2009/0153730 A1 | 6/2009 | Knee et al. | |
| 2009/0175535 A1 | 7/2009 | Mattox | |
| 2010/0090929 A1 | 4/2010 | Tsujimoto | |
| 2010/0142778 A1 | 6/2010 | Zhuo et al. | |
| 2012/0105310 A1 | 5/2012 | Sverdrup et al. | |
| 2012/0146891 A1 | 6/2012 | Kalinli | |
| 2012/0176296 A1 | 7/2012 | Border et al. | |
| 2012/0300112 A1 | 11/2012 | Natsume | |
| 2013/0050485 A1 | 2/2013 | Tiana | |
| 2013/0125155 A1 | 5/2013 | Bhagavathy et al. | |
| 2013/0169683 A1 | 7/2013 | Perez et al. | |
| 2013/0285885 A1 | 10/2013 | Nowatzyk et al. | |
| 2014/0085505 A1 | 3/2014 | Asuka et al. | |
| 2014/0125785 A1 | 5/2014 | Na et al. | |
| 2014/0218468 A1 | 8/2014 | Gao et al. | |
| 2014/0247277 A1 | 9/2014 | Guenter et al. | |
| 2014/0247286 A1 | 9/2014 | Chi | |
| 2014/0266990 A1 | 9/2014 | Makino et al. | |
| 2014/0268360 A1 | 9/2014 | Ellsworth | |
| 2014/0361977 A1 | 12/2014 | Stafford et al. | |
| 2014/0375680 A1 | 12/2014 | Ackerman et al. | |
| 2015/0042814 A1* | 2/2015 | Vaziri | G02C 11/10 348/158 |
| 2015/0235453 A1 | 8/2015 | Schowengerdt et al. | |
| 2016/0034032 A1 | 2/2016 | Jeong | |
| 2016/0080653 A1* | 3/2016 | Kim | G06T 5/002 348/216.1 |
| 2016/0109712 A1 | 4/2016 | Harrison et al. | |
| 2016/0187969 A1 | 6/2016 | Larsen et al. | |
| 2016/0246055 A1 | 8/2016 | Border et al. | |
| 2016/0320559 A1 | 11/2016 | Richards | |
| 2016/0328030 A1 | 11/2016 | Kimura et al. | |
| 2017/0359510 A1 | 12/2017 | Lane | |
| 2018/0035058 A1 | 2/2018 | Thumpudi et al. | |
| 2018/0218661 A1 | 6/2018 | Guenter | |
| 2018/0217383 A1 | 8/2018 | Guenter | |
| 2018/0218217 A1 | 8/2018 | Guenter et al. | |

OTHER PUBLICATIONS

Guenter, et al., "Supplement to Foveated 3D Graphics: User Study Details", In Journal of ACM Transactions on Graphics, vol. 31, No. 6, Nov. 20, 2012, 4 pages.

Guenter, et al., "Foveated 3D Graphics", In Journal of ACM Transactions on Graphics, vol. 31, Issue 6, Nov. 2012, 10 Pages.

LaValle, Steven M., "The Physiology of Human Vision", In Book of Virtual Reality, Chapter 5, Jan. 2015, 17 Pages.

Poletti, et al., "Microscopic Eye Movements Compensate for Non-homogeneous Vision within the Fovea", In Journal of Current Biology, vol. 23, Issue 17, Sep. 9, 2013, 5 Pages.

Rolland, Jannick, et al., "Head-Mounted Display Systems", In Encyclopedia of Optical Engineering, Mar. 2005, 14 Pages.

Stengel, et al., "An Affordable Solution for Binocular Eye Tracking and Calibration in Head-mounted Displays", In Proceedings of the 23rd ACM international conference on Multimedia, Oct. 26, 2015, 10 Pages.

"Non Final Office Action Issued in U.S. Appl. No. 15/421,150", dated May 31, 2018, 34 Pages.

"Non Final Office Action issued in U.S. Appl. No. 15/421,228", dated Aug. 27, 2018, 23 Pages.

"International Search Report and Written Report issued in PCT Application No. PCT/US2018/016187", dated Aug. 21, 2018, 15 Pages.

"Final Office Action Issued in U.S. Appl. No. 15/421,150", dated Nov. 23, 2018, 28 Pages.

"Non Final Office Action Issued in U.S. Appl. No. 15/421,252", dated Nov. 1, 2018, 18 Pages.

* cited by examiner

FOVEATED CAMERA FOR VIDEO AUGMENTED REALITY AND HEAD MOUNTED DISPLAY

BACKGROUND

Augmented reality is becoming a greater part of the computer user experience. Through augmented reality, a computer user wears a head mounted display ("HMD") that projects computer generated images onto a real-world scene, thus augmenting the scene with computer generated information. This information can be in the form of graphics or text. Cameras mounted on the head mounted display pick up the images of what the user is looking at in the real world. In order to match the high resolution of human viewing, these cameras need to have extraordinarily high resolution on the order of 50 megapixels. A 50 megapixel camera requires tremendous processing power to process all of those pixels, but HMDs are limited in their computing power and battery power. It is not economical or practical from an engineering standpoint to use 50 megapixel cameras. However, there remains a desire for high resolution images for a user to view in order to make the augmented reality experience truly immersive.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to a method for using a foveated camera for video augmented reality and a head mounted display. The method includes placing a camera in a binning mode; capturing a full frame binned image using the camera and turning off the binning mode of the camera; selecting a region of interest within the full frame; capturing the region of interest at a higher resolution than the resolution of the camera when in binning mode; compositing the region of interest with the full frame binned image; and displaying the composited image.

Additional aspects include a head mounted display that includes a camera capable of capturing a region of interest and of binning; a display; a processor coupled to the camera and the display, the processor operable to place the camera in a binning mode; capture a full frame binned image; designate a region of interest within the camera frame; capture the region of interest using the camera; and composite the region of interest with the full frame binned image.

Additional aspects include computer readable media containing computer executable instructions which, when executed by a computer, perform a method comprising the acts of receiving a lower resolution binned full frame image from a camera; receiving a higher resolution region of interest image from within a frame of the camera; compositing the received lower resolution image with the higher resolution image; and displaying the composited image.

Additional aspects include a method of reducing motion blur by enhancing the perceived frame rate. The method includes computing a scene for a left frame at time $t=0$; displaying the computed scene for left frame at time $t=0$; computing a scene for a right frame at time $t=n/2$, where n is the refresh period for the left frame and the right frame; and displaying the computed scene for the right frame at time $t=n/2$.

Examples are implemented as a method, computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
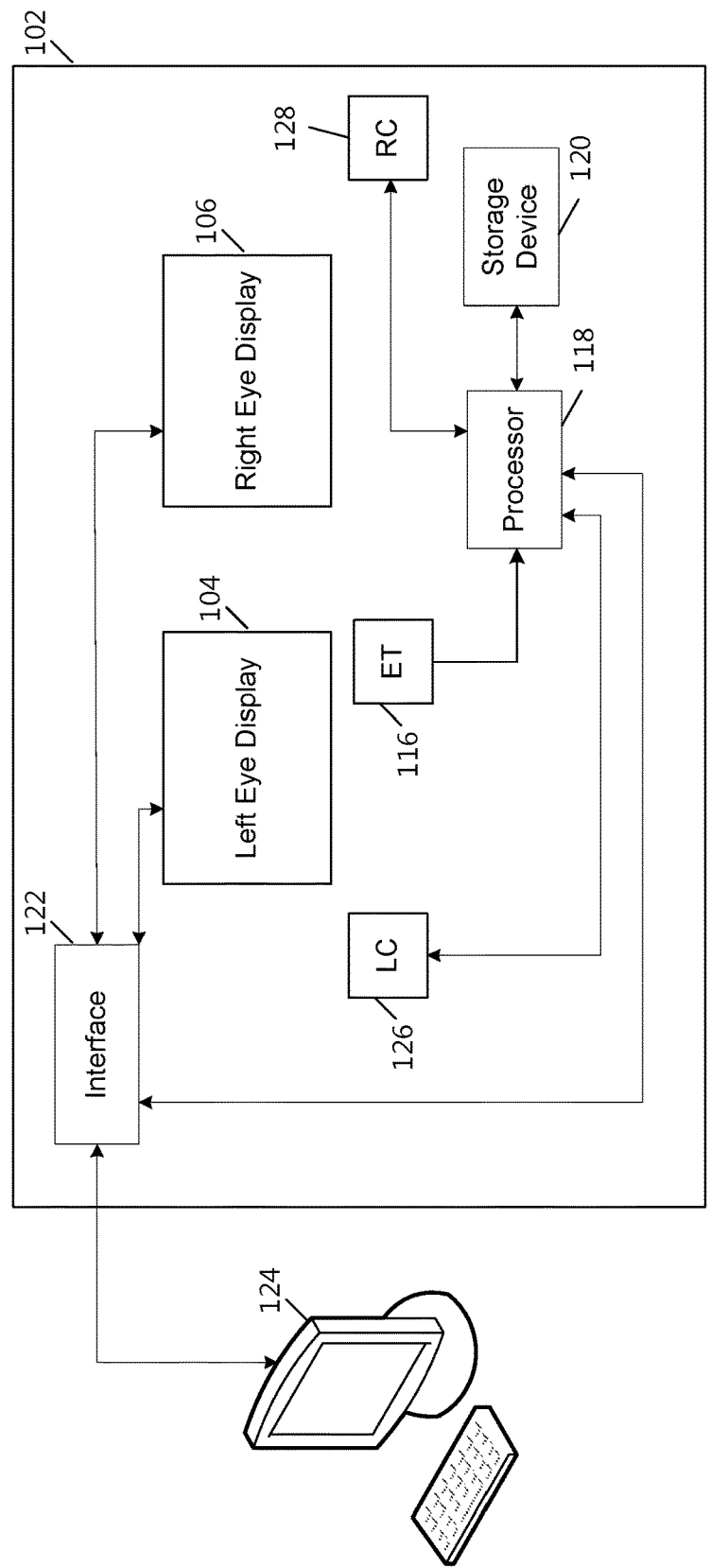
FIG. 1 is a block diagram of an example head mounted display.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method and system for using a foveated camera for video augmented reality and a head mounted display. Foveated imaging is a digital image processing technique in which the image resolution, or amount of detail, varies across the image according to one or more fixation points. A fixation point indicates the highest resolution region of the image and corresponds to the center of the eye's retina; the fovea. Because matching human vision requires high resolution cameras, on the order of 50 megapixels, processing this amount of information is computationally expensive, relatively slow, and requires a lot of power. This is not practical for most heat mounted display units; many of which are not tethered to workstations that can provide that kind of power.

However, modern cameras may have two features that can be taken advantage of to provide the high immersion sought, while not suffering from the high computational and power requirements of processing a full 50 megapixel image. The first feature is called "region of interest" that allows a system to inform a camera to capture just a part of an image. So, for example, instead of capturing a full 16 megapixels or 50 megapixels of an image, the system can instruct the camera to only capture a portion, for example, a 200×200 pixel square from anywhere in the field of view.

The second feature is known as "binning." Binning permits the camera to receive an instruction from a system to only capture the average of an n×n number of pixels. For example, the camera can be instructed to only capture the full image by averaging 2×2 or 3×3 areas of pixels. Thus, the effective resolution of the image is reduced. For example, for a 16 megapixel camera instructed to perform 4×4 binning, the resultant image is only $\frac{1}{16}^{th}$ the size of a full 16 megapixel image.

The present disclosure takes advantage of both "region of interest" and binning to produce a composite picture that features a high resolution region of interest embedded within a full frame that has been binned. The "region of interest" can be determined as either the center of the screen, or, using eye tracking, the region of interest will be the area at which the eye is looking. Furthermore, in order to enhance the look of the compositing, late stage re-projection is used to make up for the delay between the time at which the region of interest is captured and the full binned image is captured. In addition, the disclosure may use feathering to smooth out the periphery around the region of interest where it meets the binned image.

FIG. 1 is a block diagram of an example head mounted display (HMD 102). An HMD 102 includes a Left Eye Display 104 and a Right Eye Display 106. Each display is coupled via an Interface 122 to a Processor 118 that handles the control of the camera and the compositing of the binned image with the region of interest. An optional Eye Tracking unit 116 coupled to the Processor 118 provides the Processor 118 with the current region of interest on which a user of the HMD 102 is focused. A pair of cameras, Left Camera 126 and Right Camera 128, pick up the external scene and are coupled to Processor 118. The cameras may be high resolution cameras, typically between 16 megapixels and 50 megapixels. Processor 118 can be, for example, a microprocessor, microcomputer, a digital signal processor, or a graphics processing unit. Processor 118 drives the synchronization signals to the displays 104 and 106 as well as any synchronization signals to the cameras 126 and 128.

A Storage Device 120 stores the region of interest image and the full frame binned image that will be used in compositing the picture.

Interface 122 couples the Processor 118 to a computer 124. The computer 124 typically provides the augmented images and text to be superimposed upon the images received from the cameras. While the compositing has been described as being performed by the Processor 118, processing of compositing the images may be performed by the computer 124 in alternative embodiments of the disclosure.

Figure 2:
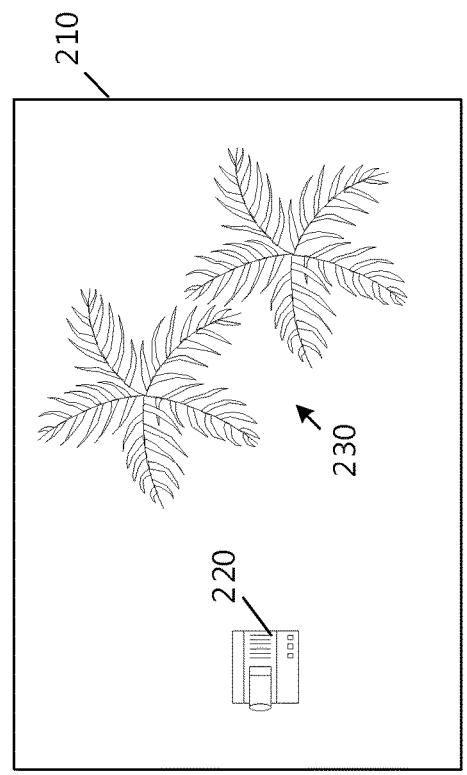
FIG. 2 is an illustration of a frame with a region of interest and the remainder of the frame not of interest.

FIG. 2 is an illustration of a frame with a region of interest and the remainder of the frame not of interest. In this illustration, the eye tracker 116 has noted that the user's eye is focused on the object 220. This will become the region of interest, so the cameras 126, 128 will be instructed to take a high resolution image of only this area. The resolution may be of an area of approximately 200×200 pixels, but those of ordinary skill in the art after reading this disclosure will appreciate that other sizes of regions of interest are possible.

The remainder of the frame 210, such as palm fronds 230, will have a binned picture taken. This binned picture will be a lower resolution picture with a bin of size, for example, 4×4 binning value. Other binning sizes are also possible depending upon the amount of computer power available and the degree of resolution desired for the remainder of frame 210. Once the binned picture is composited with the region of interest image, the frame will comprise a high resolution image around the region of interest and a low resolution image around the remainder of the frame.

Also, prior to compositing, late stage re-projection may need to be performed to align the region of interest and the low resolution full frame, binned image. This is because there is some small time period, say two milliseconds for a camera with a fast shutter speed, in which there may have been some movement between when the region of interest was captured and when the full frame was captured. Thus, the binned, full frame image may have to be slightly transformed and/or rotated prior to compositing occurring.

In an alternative embodiment, there may be more than two levels of resolution: a high resolution region of interest image and a lower resolution full frame image. For example, one can foresee a three level resolution composite image. This would comprise the high resolution region of interest; a medium resolution binned area surrounding the region of interest, and a lower resolution binned area for the remainder of the frame. For example, the region of interest may be captured in full resolution 200×200 pixel square; a 400×400 pixel square around the region of interest may be captured at a binning value of 2×2 averaging; and the remainder of the frame may be captured at a 4×4 binning value. Then, all three of these images, following late stage re-projection, would be combined into the final image to be displayed.

Figure 3:
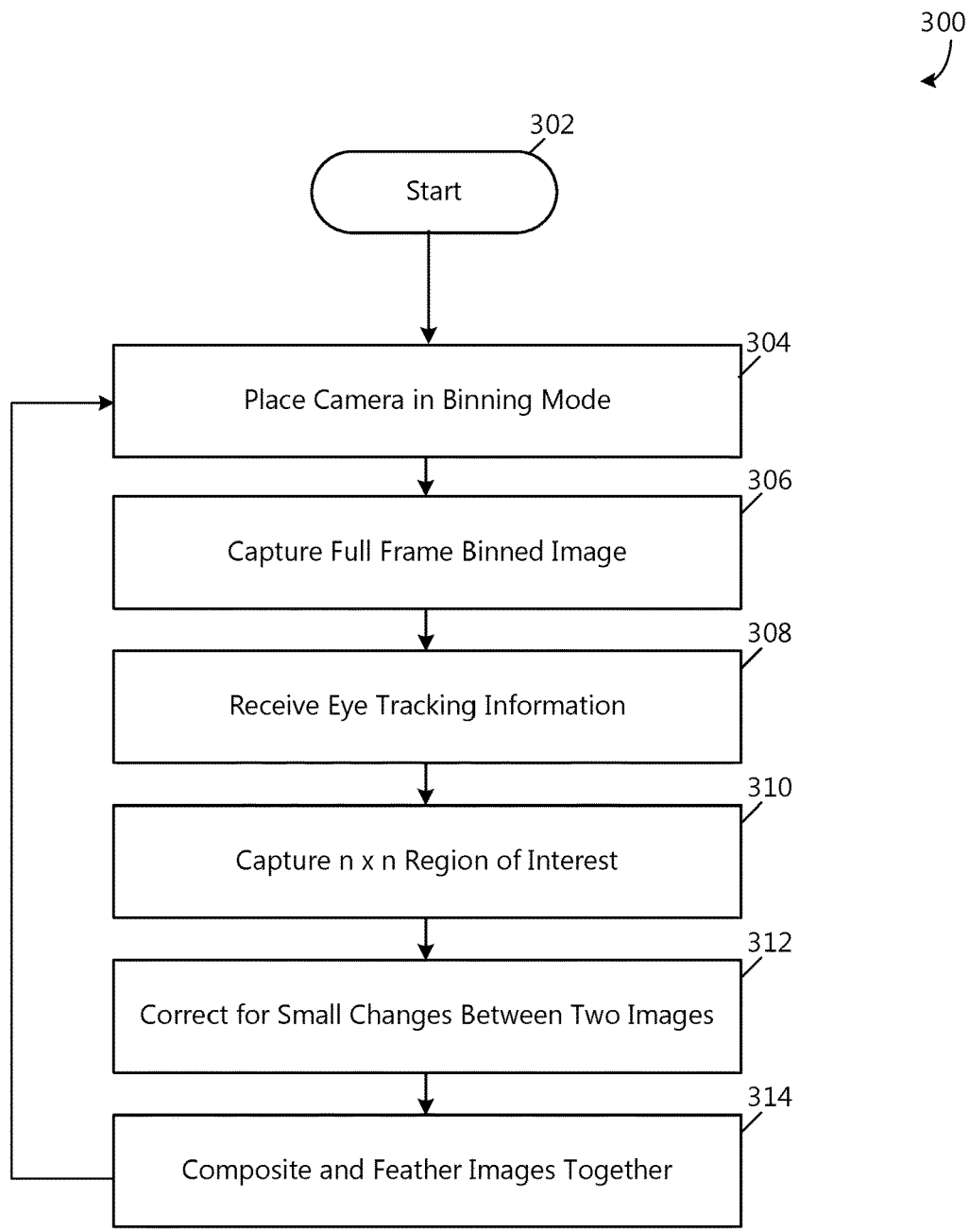
FIG. 3 is a flow chart showing general stages involved in an example method of using a foveated camera to improve immersiveness in a head mounted device used in augmented reality applications.

FIG. 3 is a flow chart showing general stages involved in an example method of using a foveated camera to improve immersiveness in a head mounted device used in augmented reality applications. Method 300 begins at Start 302 and proceeds to OPERATION 304. At this operation, the camera is placed into binning mode and a binning value, such as 4×4 is set. At OPERATION 306, a full frame binned image is captured. At OPERATION 308, eye tracking information is received and a region of interest within the frame is determined based on this eye tracking information. In those systems lacking eye tracking information, the region of interest is determined to be the center of the image. At OPERATION 310, an n×n region of interest is captured where n may be 200 for example. Note that the region of interest need not be a square and other shaped regions of interest, such as circles or rectangles for example, could be selected.

At OPERATION 312, late stage re-projection is performed to account for small translational and rotational changes that may have taken place between when the full frame binned image was captured and when the region of interest was captured. In other words, the full frame image may be slightly translated and rotated to account for changes that occur between shots, typically 2 ms or less. At OPERATION 314, the re-projected binned image and the region of interest are composited together and sent to the displays. During compositing, the region around the region of interest may also be feathered to make a smoother transition between the region of interest and the remainder of the frame. The method 300 then returns to OPERATION 304.

In an additional improvement, it is possible to improve the apparent refresh rate of the displays 104 and 106. Refresh rates of HMDs are currently around 90 Hz, so the signal is being refreshed approximately every 11 ms. Both displays are typically refreshed in sync, so that at time, t=0, both begin scanning from the top of the display downward. But a problem is that this refresh rate still leads to a strobing appearance if the user of the HMD 102 moves one's head quickly.

It is desirable to increase the refresh rate of the displays 104 and 106. One method is to not change the refresh rate of the displays 104, 106, but rather to improve the apparent refresh rate. The apparent refresh rate may be improved by staggering the refresh times of the left and right displays 104 and 106, instead of having both displays 104, 106 refreshed at the same time. In a staggered refresh rate, the left display 104 may begin to be refreshed at time t=0 ms as before; however, given a refresh rate of 90 hz, for example, the right display 106 will be refreshed from top to bottom beginning at time t=5.5 ms. Thus the refresh rates of both displays are still 90 Hz, but because the refresh rate of one of the displays is staggered by half the refresh rate, the user's brain sees a refresh rate of 180 hz.

Because of the time delay between refreshing the left display 104 and the right display 106 (recall that the left display 104 is refreshed at time t=0 ms, while the right display 106 is refreshed at time t=5.5 ms) the images shown in the display must be calculated and generated for these different times. Also, any cameras associated with the system need to be synced with the displays 104, 106, so that the camera 126 associated with the left display 104 will have a sync signal sent that corresponds to the refresh time of the left display 104 and the camera 128 associated with the right display 106 will have a sync signal sent that corresponds to the refresh time of the right display 106.

Thus, everything is staggered by half a frame: both the images generated by the computer 124 and the images generated by the cameras 126 and 128.

Figure 4:
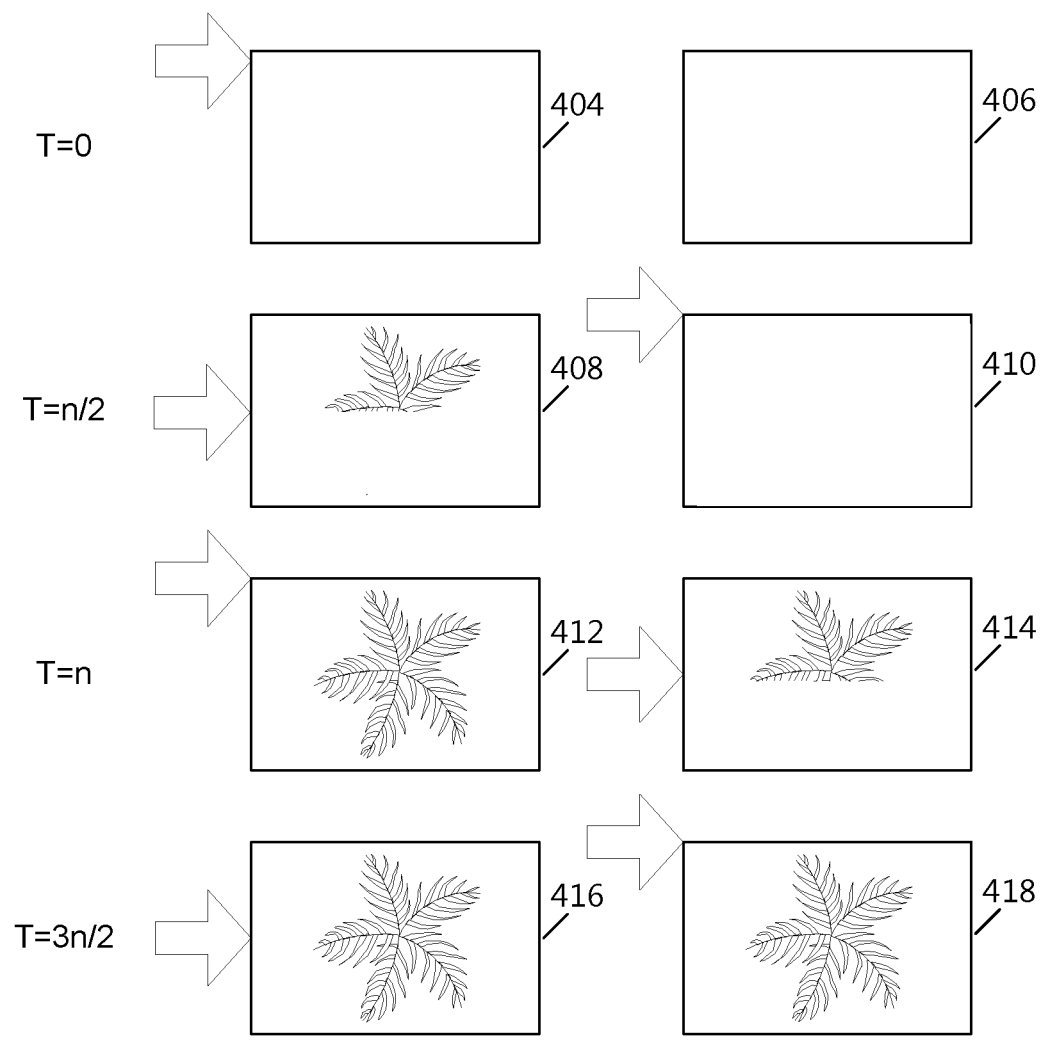
FIG. 4 is an illustration of left and right displays over several cycles when staggered updating of displays is implemented.

FIG. 4 is an illustration of left and right displays 104, 106 over several cycles when staggered updating of displays is implemented. Illustrated are the refresh and scan lines of a left and right display 104, 106 over time. In this illustration, n is the refresh rate, e.g. 90 Hz or 1/90$^{th}$ of a second or approximately 11 ms. At time t=0 ms, the left display 404 refresh begins with the current scan line situated at the top of the left display 104. The right display 406 is on a 5.5 ms or n/2 delay, so it has not yet begun scanning.

At time t=n/2 or 5.5 ms into the display period, the scan of the left display 408 is halfway through its scan. The scan of the right display 410 is just beginning at this time. At time t=n or 11 ms into the display period, the scan of the left display 412 has completed and scanning has returned to the top row of the display. The right display 414 is now halfway through its scan.

Finally, at time t=3n/2 or 16.5 ms, the left display 416 is in the middle of its second scan and the right display 418 has completed its first scan and is just beginning its second scan.

Thus, the refresh rates of both displays are 90 Hz; however, the refresh time is staggered between the left and right displays 104, 106 giving the brain the impression of a 180 Hz scan rate.

Figure 5:
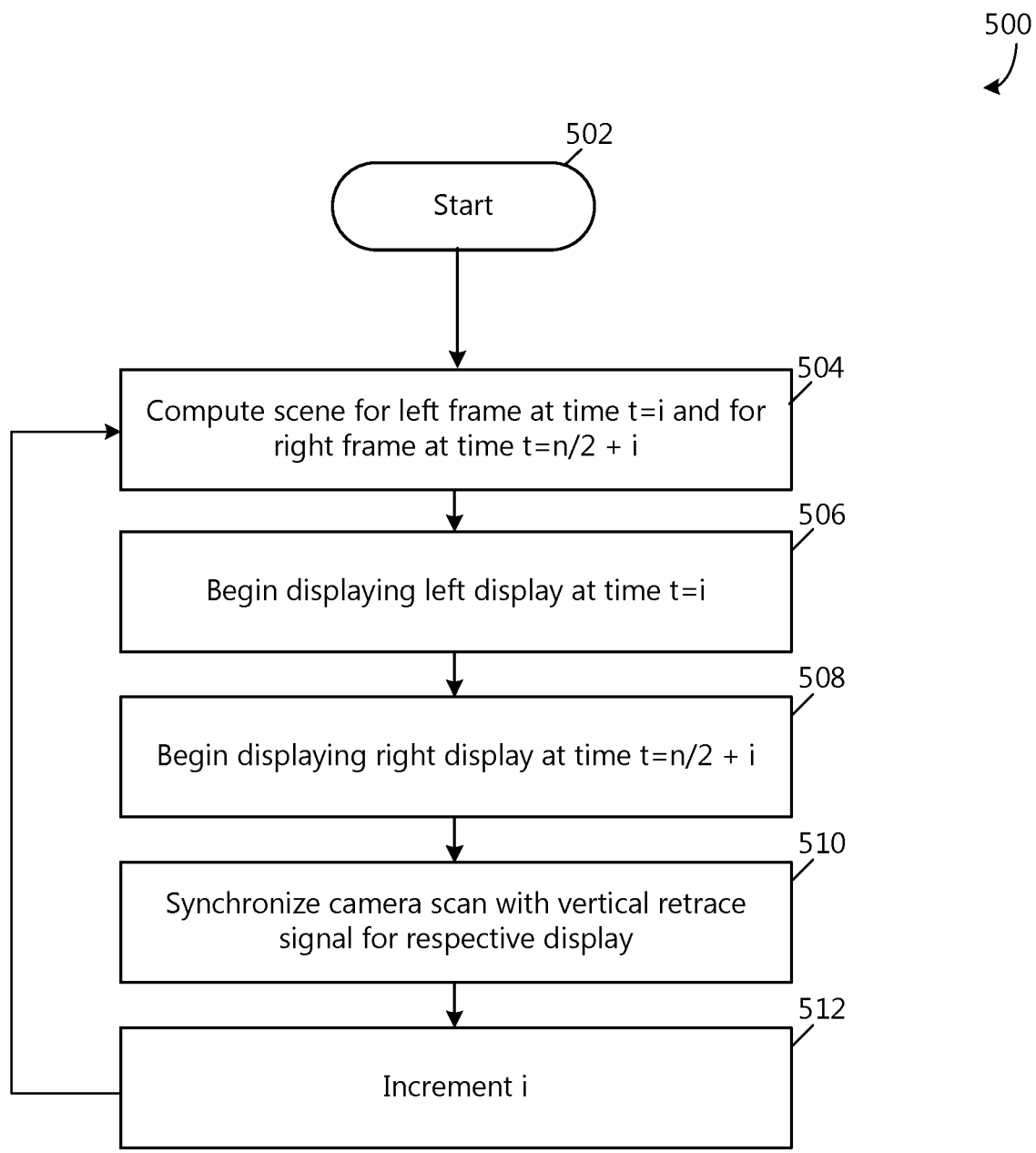
FIG. 5 is a flow chart showing general stages involved in an example method of staggering display refresh to generate a higher apparent refresh rate.

FIG. 5 is a flow chart showing general stages involved in an example method of staggering display refresh to generate a higher apparent refresh rate. Method 500 begins at Start OPERATION 502 where the variable i is set to zero and continues to OPERATION 504. At this operation, readings from the HMD 102 are taken informing the method 500 of the head position, and from this the scene is computed for the left eye at time t=i. Then, at time t=i+n/2, where n is equal to the refresh period, for example 11 ms in a 90 Hz refresh rate system, the head position is read from the HMD 102 and used to calculate the scene at that time.

At OPERATION 506, the method 500 begins to display the left display at time t=i. At OPERATION 508, the right display will begin displaying at time t=n/2+i. If the method 500 is operating as an augmented display device, versus a virtual reality device, then at OPERATION 510, the cameras are synchronized with the respective vertical retrace signals for the respective displays. In other words, the right display is synced with the right camera and the left display is synced with the left camera. Then, at OPERATION 512, i is incremented by n milliseconds and the method 500 returns to OPERATION 504.

The aspects and functionalities described herein may operate via a multitude of computing systems including, without limitation, head mounted displays with and without computer assistance, or head mounted displays in conjunction with desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein may operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
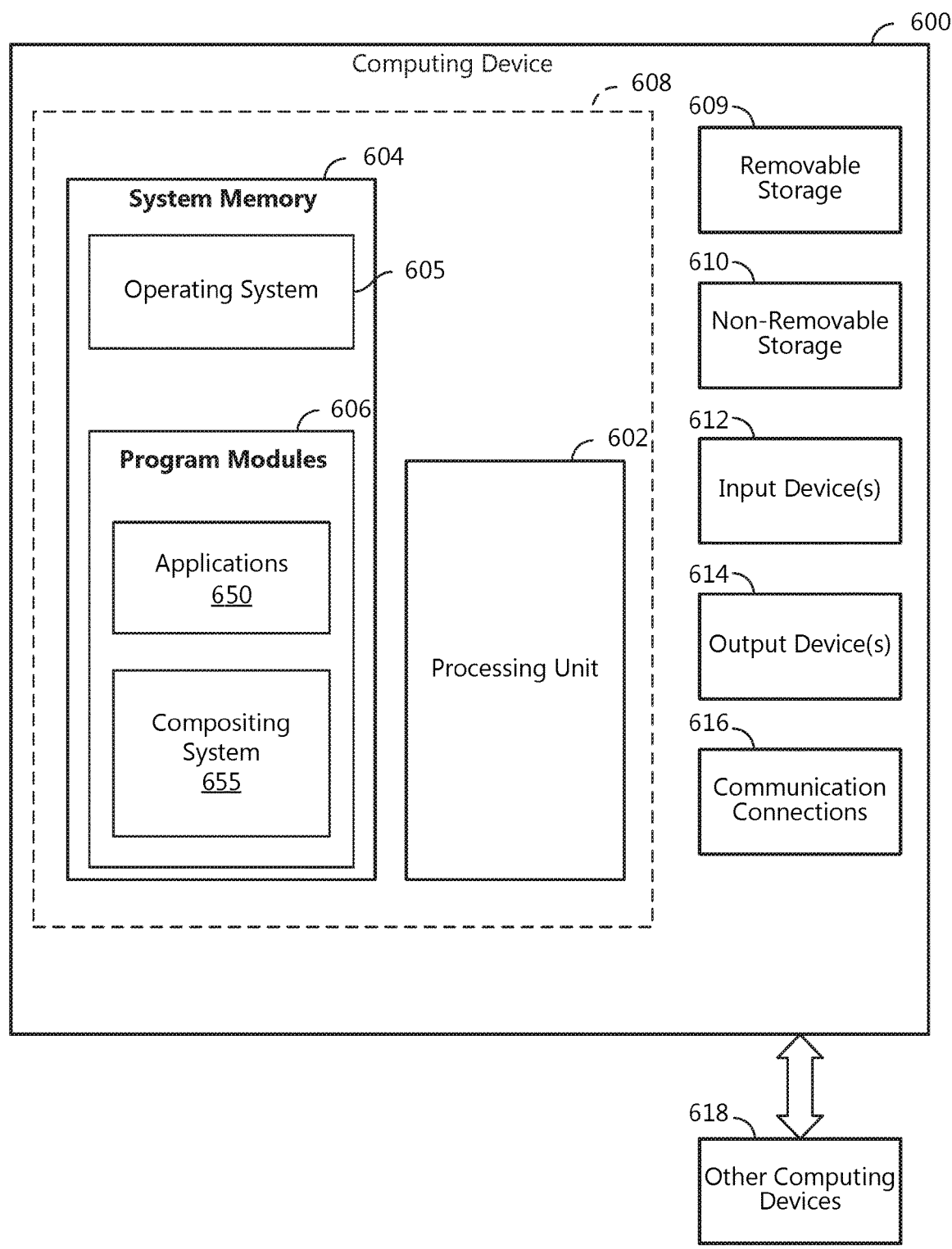
FIG. 6 is a block diagram illustrating example physical components of a computing device.

FIGS. 6 and 7 and the associated descriptions provide a discussion of a variety of operating environments in which examples are practiced. However, the devices and systems illustrated and discussed with respect to FIGS. 6 and 7 are for purposes of example and illustration and are not limiting of a vast number of computing device configurations that are utilized for practicing aspects, described herein.

FIG. 6 is a block diagram illustrating physical components (i.e., hardware) of a computing device 600 with which examples of the present disclosure may be practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more program modules 606 suitable for running software applications 650. According to an aspect, the system memory 604 includes the compositing system 655. The operating system 605, for example, is suitable for controlling the operation of the computing device 600. Furthermore, aspects are practiced in conjunction with a graphics library, other operating systems, or any other application program, and are not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., compositing system 655) perform processes including, but not limited to, one or more of the stages of the methods 300 and 500 illustrated in FIGS. 3 and 5. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 6 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 600 has one or more input device(s) 612 such as a keyboard, a mouse, a pen, a sound input device, a touch input device, etc. The output device(s) 614 such as a head mounted display, display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

Figure 7A:
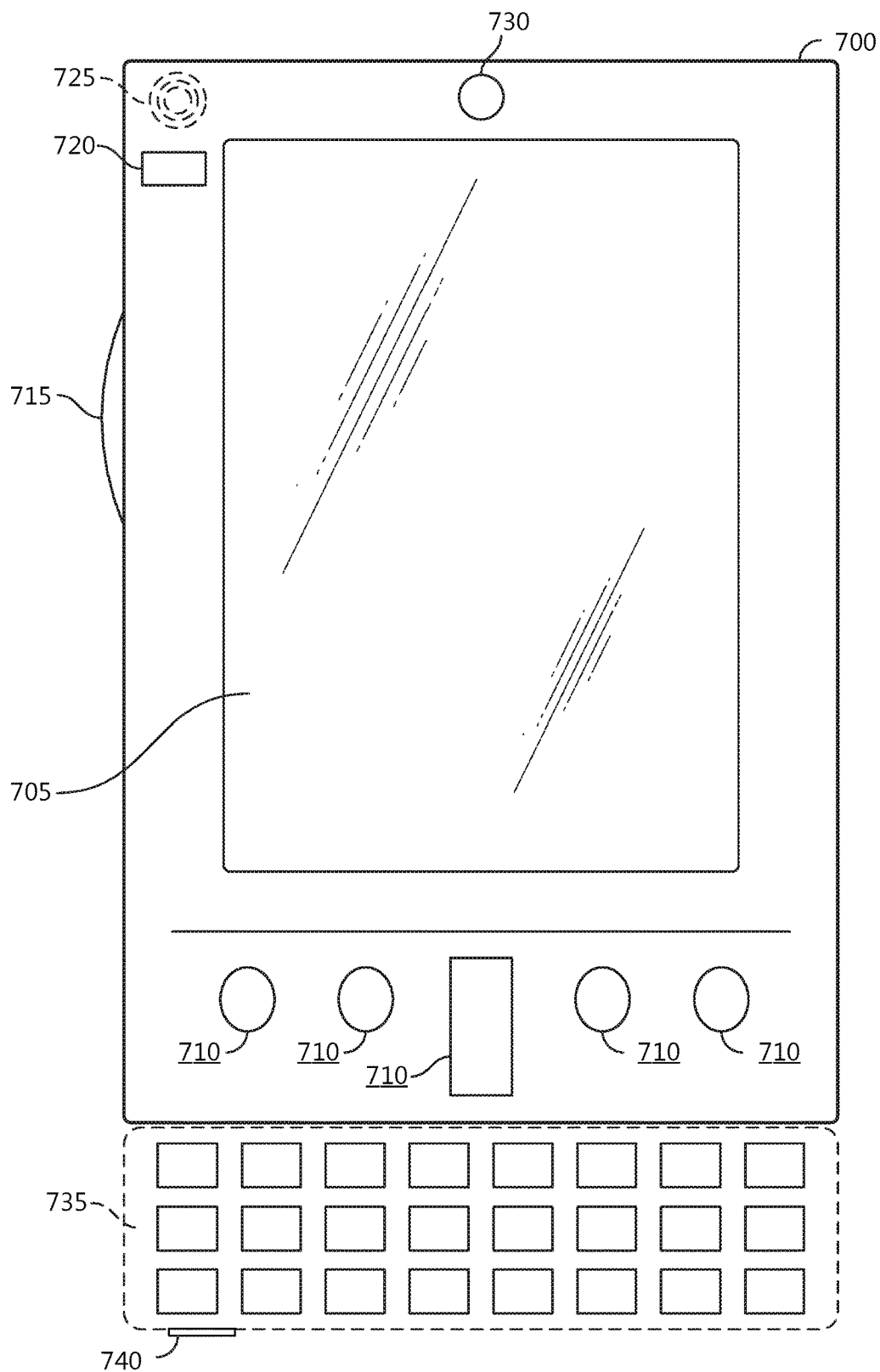
FIGS. 7A and 7B are simplified block diagrams of a mobile computing device.
Figure 7B:
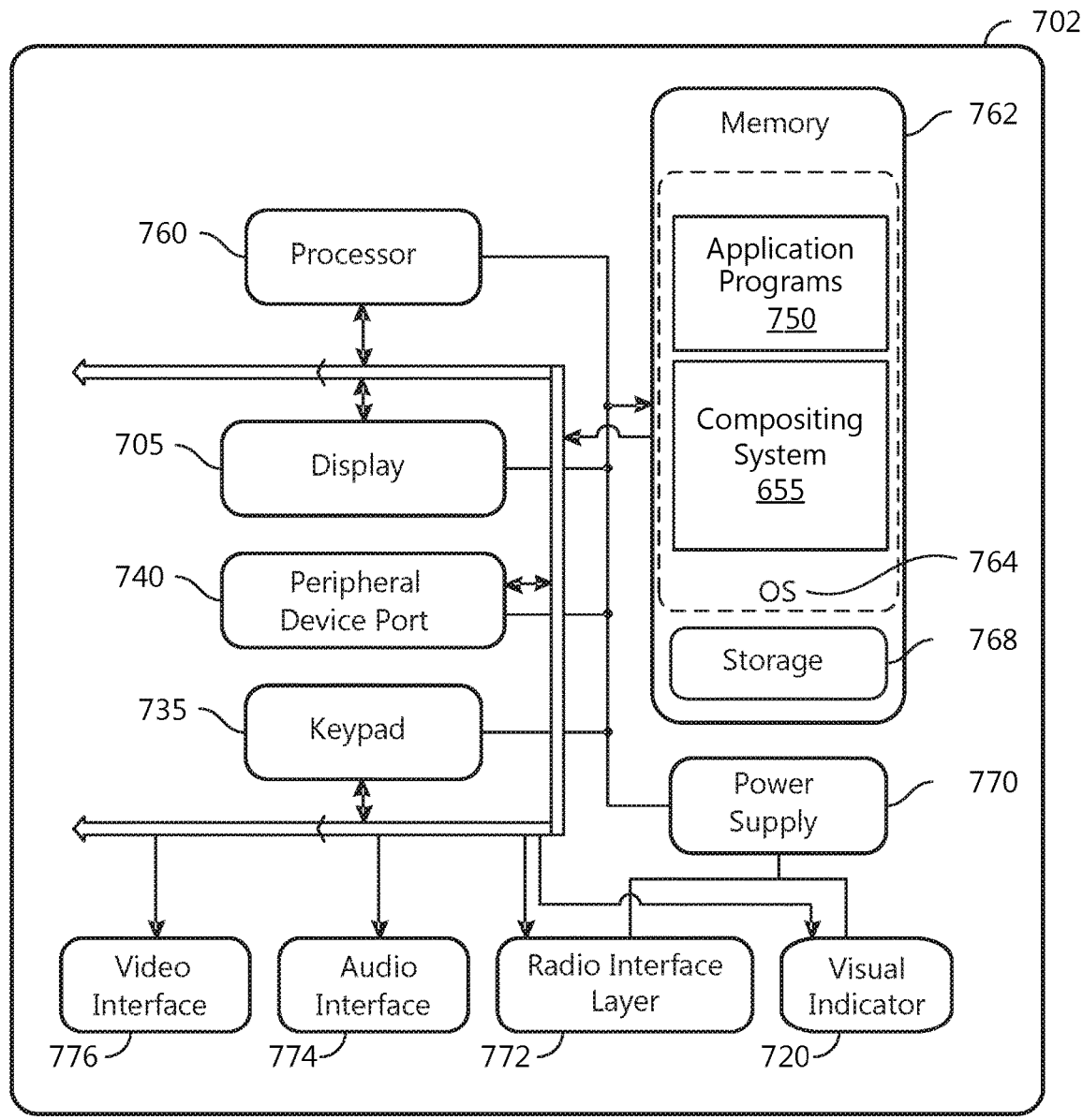

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or less input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, the compositing system 655 is loaded into memory 762. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 is stored locally on the mobile computing device 700, as described above. According to another aspect, the data is stored on any number of storage media that is accessible by the device via the radio 772 or via a wired connection between the mobile computing device 700 and a separate computing device associated with the mobile computing device 700, for example, a server computer in a distributed computing network, such as the Internet. As should be appreciated such data/information is accessible via the mobile computing device 700 via the radio 772 or via a distributed computing network. Similarly, according to an aspect, such data/information is readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A method, comprising:
   providing a head-mounted display comprising a right lens, a left lens, and a camera;
   placing the camera in a binning mode;
   capturing a full frame binned image using the camera and turning off the binning mode of the camera;
   selecting a region of interest within the full frame;
   capturing the region of interest at a higher resolution than the resolution of the camera when in the binning mode;
   compositing the region of interest with the full frame binned image; and
   displaying the composited image, wherein the left lens is refreshed with the composited image at a first time, wherein the right lens is refreshed with a next composited image at a second time, and wherein the second time is half a refresh period from the first time.

2. The method of claim 1, further comprising performing late stage re-projection on the full framed binned image prior to compositing the region of interest with the full frame binned image.

3. The method of claim 2, wherein performing late stage re-projection of the full framed binned image comprises rotating the full framed binned image to match any rotation of the region of interest.

4. The method of claim 2, wherein performing late stage re-projection of the full framed binned image comprises translating the full framed binned image to match any translation of the region of interest.

5. The method of claim 1, further comprising capturing a partial frame binned image immediately around the region of interest, where the binning value is less than a binning value of the captured full frame image.

6. The method of claim 5, wherein compositing further comprises compositing the region of interest with the partial frame binned image with the full frame binned image.

7. The method of claim 1, wherein compositing further comprises feathering the area around the edge of the region of interest.

8. A head mounted display, comprising:
   a camera capable of capturing a region of interest and of binning;
   a display comprising:
     a right lens; and
     a left lens;
   a processor coupled to the camera and the display, the processor operable to:
     place the camera in a binning mode;
     capture a full frame binned image;
     designate a region of interest within the camera frame;
     capture the region of interest using the camera;
     composite the region of interest with the full frame binned image;
     refresh the left lens with the region of interest with the full frame binned image at a first time; and
     refresh the right lens with a next region of interest with a next full frame binned image at a second time, and wherein the second time is half a refresh period from the first time.

9. The head mounted display of claim 8, further comprising an eye tracking unit coupled to the processor.

10. The head mounted display of claim 9, wherein the processor is further operable to designate a region of interest within the camera frame based on information received from the eye tracking unit.

11. The head mounted display of claim 8, wherein the processor is operable to, prior to compositing, perform late stage re-projection.

12. The head mounted display of claim 11, wherein performing late stage re-projection comprises rotating the full frame binned image to match any rotation of the region of interest.

13. The head mounted display of claim 11, wherein performing late stage re-projection comprises translating the full frame binned image to match any translation of the region of interest.

14. The head mounted display of claim 8, wherein the processor is further operable to take a binned image of the area immediately surrounding the region of interest and wherein the binning value of this intermediate area is less than the binning value of the full framed binned image.

15. The head mounted display of claim 8, wherein the composite action of the processor further includes the capability of compositing the area of interest with the intermediate area and with the full framed binned image.

16. A computer storage medium associated with a head-mounted display comprising a right lens, a left lens, and a camera, the computer storage medium containing computer executable instructions which, when executed by a computer, perform a method comprising the acts of:
   receiving a lower resolution binned full frame image from the camera;
   receiving a higher resolution region of interest image from within a frame of the camera;
   compositing the received lower resolution image with the higher resolution image; and
   displaying the composited image, wherein the left lens is refreshed with the composited image at a first time, wherein the right lens is refreshed with a next composited image at a second time, and wherein the second time is half a refresh period from the first time.

17. The computer storage medium of claim 16 having further instructions for:
   feathering the pixels around the higher resolution image where it meets the lower resolution area.

18. The computer storage medium of claim 17 having further instructions for placing the camera in a binning mode prior to receiving the lower resolution binned full frame image from the camera.

19. The computer storage medium of claim 16 having further instructions for placing the camera in a binning mode and capturing an intermediate region around the region of interest at a binning value less than a binning value of the full frame image.

20. The computer storage medium of claim 19 having further instructions for compositing the received lower resolution image with the intermediate region with the higher resolution region of interest.

* * * * *